(No Model.) 3 Sheets—Sheet 2.

E. FISHER.
HEEL NAILING MACHINE.

No. 248,582. Patented Oct. 25, 1881.

Witnesses
Inventor:
Edwin Fisher,
by Crosby & Gregory
Attys (No Model.)

3 Sheets—Sheet 3.

E. FISHER.
HEEL NAILING MACHINE.

No. 248,582. Patented Oct. 25, 1881.

Witnesses.
John F. C. Prescott
Geo. W. Finckel

Inventor:
Edwin Fisher
by Crosby & Gregory
Attys

UNITED STATES PATENT OFFICE.

EDWIN FISHER, OF WORCESTER, ASSIGNOR TO JAMES W. BROOKS, TRUSTEE, OF CAMBRIDGE, MASSACHUSETTS.

HEEL-NAILING MACHINE.

SPECIFICATION forming part of Letters Patent No. 248,582, dated October 25, 1881.

Application filed August 16, 1881. (No model.)

*To all whom it may concern:*

Be it known that I, EDWIN FISHER, of Worcester, county of Worcester, and State of Massachusetts, have invented a new and useful Improvement in Heel-Nailing Machines, of which the following description, in connection with the accompanying drawings, is a specification.

This invention relates to mechanism by which to drive nails into heels of boots and shoes.

In this my invention a lever actuated by a link in connection with a crank on a shaft rotated intermittingly for a single rotation and then stopped through the agency of a clutch mechanism, to be described, is joined at its front end with a vertically-reciprocating slide provided with a plate, in which are held the drivers which are to strike and drive nails from the nail-holder into the heel-pile under it, the latter on an adjustable bed or support, provided with a heel-seat block. By substituting a gang of awls for the gang of drivers, and removing the heel-seat block and employing a holder for the heel-pile, the mechanism herein described may be used to prick holes in the heel pile or lift, to prepare it to receive nails.

Figure 2:
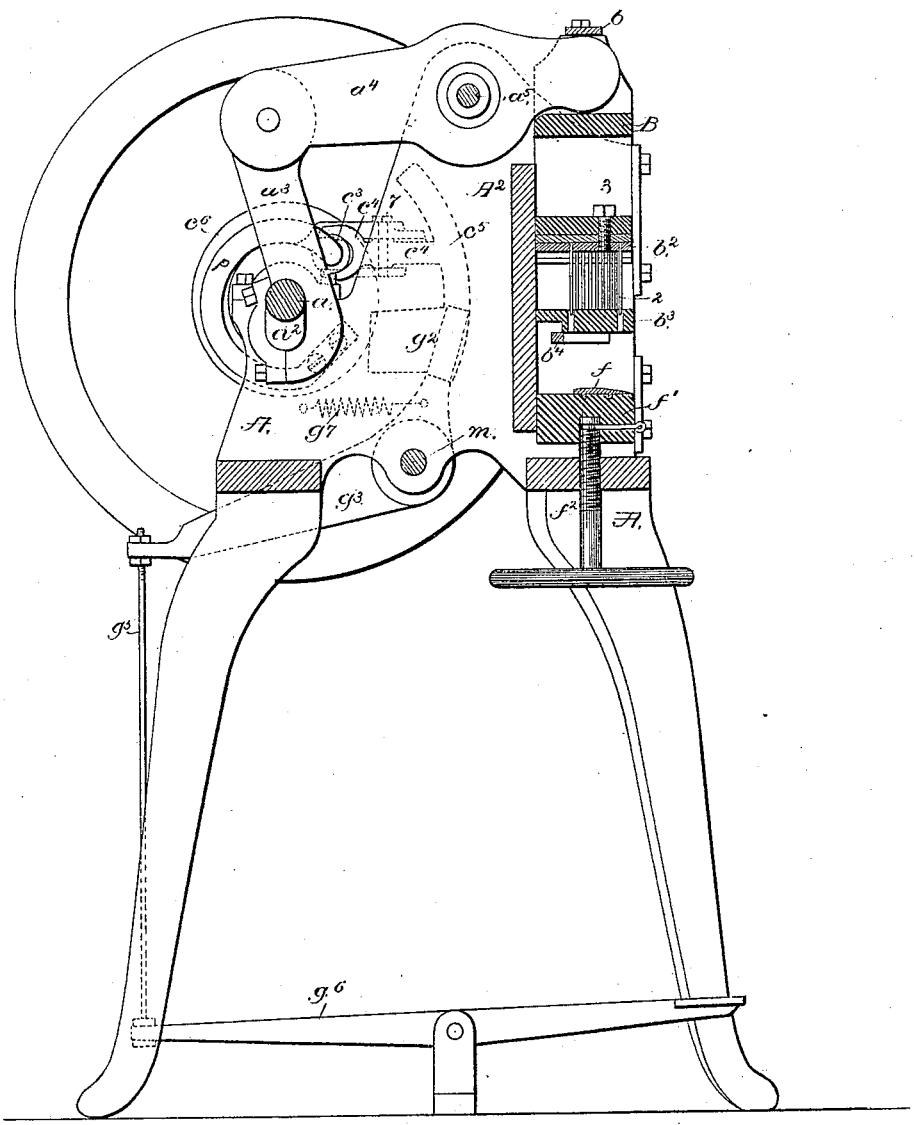
Figure 4:
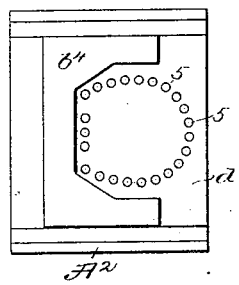
Figure 5:
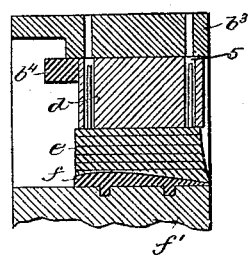
Figure 6:
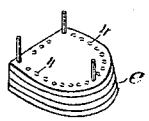
Figure 7:
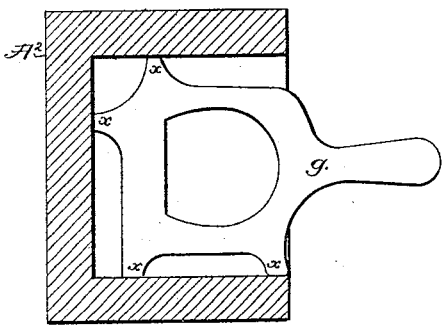
Figure 8:
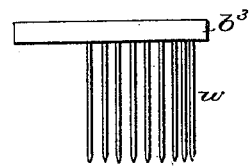

Figure 1 represents, in front elevation, a machine embodying my invention; Fig. 2, a vertical section thereof on the dotted line $x$ $x$, Fig. 1; Fig. 3, a detail showing the shaft and its stop-cam, and dog at the left of the machine; Fig. 4, a detail showing a plan view of the gage which receives the nail-holding plate; Fig. 5, a vertical section, on an enlarged scale, of the said gage, nail-holding plate, and heel-pile; Fig. 6, a perspective view of a heel-pile having three nails set up therein to position the nail-holding plate with relation to the holes in the said heel-pile. Fig. 7 is a detail of the heel-pile holder which I employ to hold the heel-pile when the machine has been provided with a gang of awls, and Fig. 8 shows the carriage with a gang of awls.

The frame-work A of the machine, of suitable shape to contain the working parts, has its main shaft $a$ provided with a crank, $a^2$, (shown in Fig. 2 as down,) which crank receives upon it the link $a^3$, pivoted at its upper end to the lever $a^4$, having its fulcrum at $a^5$, the forward rounded end of the said lever entering a slot at the upper end of the slide B, (see Fig. 1,) the said slot being covered by a cap, $b$, which comes in contact with the upper side of the end of the said lever $a^4$. This slide B is fitted into the part $A^2$ of the frame, and has grooves or ways to receive a carriage, $b^2$, in which is secured the gang of drivers 2, as shown in Figs. 1 and 2, (or it may be a gang of awls, as in Fig. 8,) the said carriage being held in place by the screw 3. The lower ends of these drivers or awls, whichever may be used, are guided in holes in a hole-plate, $b^3$, located immediately below which is a gage, $b^4$, which receives in it the nail-holding plate $d$, of sufficient depth to keep the nails $d^2$ upright and direct them properly into the holes 4, made in the heel-pile $e$. This heel-pile, having been provided with holes 4, has two or more nails set up therein, as in Fig. 6, to enable the operator to place the nail-holder thereon, as in Fig. 5, with its holes 5 in line with the holes 4, previously made in the heel-pile, so that nails set up in the holes of the nail-holder will be struck by the descending gang of drivers and be forced squarely into the heel-pile resting on plate $f$, placed upon the bed $f'$, made adjustable vertically by the screw $f^2$. To prick holes 4 in the heel-pile it is only necessary to substitute for the gang of drivers a gang of awls, $w$, as in Fig. 8, and remove the heel-seat plate $f$ and guide $b^4$. The heel-pile to be pricked by the said awls will be held in a heel-pile holder, $g$, (shown in Fig. 7,) it being provided with several arms, $x$, to bear at different points against three sides of the frame-work $A^2$, in which the slide B reciprocates, the said arms by their contact with the said frame-work enabling the operator to always keep and make close contact between the holder and frame-work, enabling it to be held more firmly than were the heel-pile holder made to exactly fit the said frame-work.

The belt-pulley C on the shaft $a$ is provided with a stud, $c^2$, to engage at stated intervals a sliding coupling-pin, $c^3$, having its head grooved or notched at its sides to be embraced by the forked end of a lever, $c^4$, having its fulcrum 7 in ears of a disk, $c^6$, fixed to shaft $a$. The lever $c^4$ has a broad arc-like or wedge-faced end, $c^5$, (both shown in dotted lines, Fig. 2.) This sliding coupling-pin $c^3$ is guided by the disk $c^6$, fixed to the shaft $a$. The end $c^5$ of the lever $c^4$ strikes a wedge-like or inclined part, $g^2$, of an elbow-lever, $g^3$, secured to a rock-shaft, $m$, once during each rotation of the said shaft $a$. The elbow-lever $g^3$ is connected by link $g^5$ with the treadle $g^6$, a spring, $g^7$, keeping the wedge part $g^2$ of the elbow-lever pulled toward the shaft $a$, so as to be struck by the lever $c^4$ and insure such movement thereof as will withdraw the pin $c^3$ from engagement with the stud $c^2$ and free the pulley C, a dog, $h^2$, secured to the opposite end of the rock-shaft $m$ at that time engaging the stop-cam $h^3$. (Shown in Fig. 3.) The lever $c^4$ will be acted upon constantly by a suitable spring, $p$, the tendency of which will be to force the pin $c^3$ through the disk $c^6$ to engage the stud $c^2$ on the belt-pulley.

I claim—

1. The shaft $a$ and means, substantially as described, to rotate it intermittingly one revolution and then stop it, and the link $a^3$ and lever $a^4$, combined with the slide B and a gang of drivers or awls, hole-plate to guide them, and rest to support the heel-pile, substantially as described.

2. The shaft $a$ and means, substantially as shown and described, to rotate it intermittingly one rotation at a time, and the link $a^3$ and lever $a^4$, combined with the slide B, a gang of drivers, the heel-plate, the gage below it, the nail-holder to enter the said gage, and a support or rest for the heel-pile, substantially as described.

3. The heel-pile holder $g$, having several independent arms, and, as described, combined with the frame part $A^2$, in which the said holder is inserted, as described.

In testimony whereof I have signed my name to this specification in the presence of two subscribing witnesses.

EDWIN FISHER.

Witnesses:
G. W. GREGORY,
W. H. SIGSTON.